United States Patent
Hirata

(10) Patent No.: US 11,963,039 B2
(45) Date of Patent: Apr. 16, 2024

(54) BASE STATION, TERMINAL DEVICE, AND COMMUNICATION SYSTEM

(71) Applicant: FUJITSU LIMITED, Kawasaki (JP)

(72) Inventor: Akira Hirata, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 376 days.

(21) Appl. No.: 17/472,874

(22) Filed: Sep. 13, 2021

(65) Prior Publication Data

US 2021/0410008 A1  Dec. 30, 2021

Related U.S. Application Data

(63) Continuation of application No. PCT/JP2019/016886, filed on Apr. 19, 2019.

(51) Int. Cl.
| | |
|---|---|
| H04W 4/00 | (2018.01) |
| H04L 1/08 | (2006.01) |
| H04W 28/06 | (2009.01) |
| H04W 80/02 | (2009.01) |
| H04W 88/08 | (2009.01) |

(52) U.S. Cl.
CPC ............ *H04W 28/06* (2013.01); *H04L 1/08* (2013.01); *H04W 80/02* (2013.01); *H04W 88/08* (2013.01)

(58) Field of Classification Search
CPC ...... H04W 28/06; H04W 80/02; H04W 88/08
USPC ......................................... 370/329
See application file for complete search history.

(56) References Cited

U.S. PATENT DOCUMENTS

| | | | |
|---|---|---|---|
| 9,713,148 B2* | 7/2017 | Mochizuki | ........ H04W 36/0085 |
| 10,973,007 B2* | 4/2021 | Zhou | ..................... H04W 72/20 |
| 11,553,359 B2* | 1/2023 | Abdel Shahid | ....... H04W 72/23 |

(Continued)

FOREIGN PATENT DOCUMENTS

| | | |
|---|---|---|
| EP | 2 262 289 A1 | 12/2010 |
| EP | 2 882 245 A1 | 6/2015 |

(Continued)

OTHER PUBLICATIONS

Extended European search report with the supplementary European search report and the European search opinion issued by the European Patent Office for corresponding European Patent Application No. 19924794.1-1205, dated Mar. 16, 2022.

(Continued)

*Primary Examiner* — Marceau Milord
(74) *Attorney, Agent, or Firm* — Myers Wolin, LLC

(57) ABSTRACT

A base station includes, in an aspect, a first reception unit, a first transmission unit, and a second transmission unit. The first reception unit receives information related to a communication processing state of another base station from the other base station. The first transmission unit transmits duplication of data to be transmitted to a terminal device to the other base station. The second transmission unit transmits the data to the terminal device by using radio communication. Furthermore, the first transmission unit transmits, after the transmission of the data performed by the second transmission unit has been completed, in accordance with the information related to the communication processing state of the other base station, a transmission completion notification that indicates that the transmission of the data has been completed to the other base station.

12 Claims, 10 Drawing Sheets

(56) References Cited

U.S. PATENT DOCUMENTS

| | | | |
|---|---|---|---|
| 11,601,954 B2* | 3/2023 | Gao | H04W 80/02 |
| 2013/0072259 A1 | 3/2013 | Kusano et al. | |
| 2015/0085646 A1 | 3/2015 | Vannithamby et al. | |
| 2016/0057585 A1 | 2/2016 | Horn et al. | |
| 2016/0182276 A1* | 6/2016 | Wu | H04W 36/0069 |
| | | | 370/225 |
| 2017/0289021 A1* | 10/2017 | Säily | H04W 74/006 |
| 2018/0132220 A1* | 5/2018 | Jang | H04W 76/14 |
| 2018/0220470 A1* | 8/2018 | Zacharias | H04L 5/0098 |
| 2018/0262950 A1* | 9/2018 | Malkamäki | H04L 1/1621 |
| 2018/0324642 A1 | 11/2018 | Yu et al. | |
| 2019/0098512 A1* | 3/2019 | Yi | H04W 84/047 |
| 2019/0110225 A1* | 4/2019 | Edge | H04W 28/06 |
| 2019/0215717 A1* | 7/2019 | Lee | H04W 72/21 |
| 2019/0327623 A1 | 10/2019 | Liu et al. | |
| 2019/0357196 A1* | 11/2019 | Majmundar | H04L 49/3072 |
| 2019/0373441 A1* | 12/2019 | Ryu | H04W 48/18 |
| 2020/0037200 A1* | 1/2020 | Cho | H04W 72/23 |
| 2020/0037386 A1* | 1/2020 | Park | H04W 76/25 |
| 2020/0112879 A1 | 4/2020 | Shimoda et al. | |
| 2020/0274656 A1* | 8/2020 | Gordaychik | H04L 67/125 |
| 2020/0404724 A1* | 12/2020 | Pedersen | H04W 36/0069 |
| 2021/0235315 A1* | 7/2021 | Ohta | H04W 28/0278 |
| 2021/0314969 A1* | 10/2021 | Gao | H04W 76/15 |

FOREIGN PATENT DOCUMENTS

| | | |
|---|---|---|
| JP | 2011-250215 A | 12/2011 |
| JP | 2013-520096 A | 5/2013 |
| JP | WO2018/198963 A1 | 3/2020 |
| WO | 2009/122783 A1 | 10/2009 |
| WO | 2011/100492 A1 | 8/2011 |
| WO | 2014/021447 A1 | 2/2014 |
| WO | 2018/127057 A1 | 7/2018 |

OTHER PUBLICATIONS

Notice of Reasons for Refusal issued by the Japan Patent Office for corresponding Japanese Patent Application No. 2021-514782, mailed on Dec. 6, 2022.

Communication pursuant to Article 94(3) EPC issued by the European Patent Office for corresponding European Patent Application No. 19 924 794.1-1213, mailed on May 25, 2023.

International Search Report and Written Opinion by International Searching Authority issued by Japan Patent Office for corresponding International Patent Application PCT/JP2019/016886, mailed on Jul. 9, 2019, with an English translation.

3GPP TS 38.300 V15.3.0., "3rd Generation Partnership Project; Technical Specification Group Radio Access Network; NR; NR and NG-RAN Overall Description; Stage 2 (Release 15)", Sep. 2018.

CMCC, "Flow control function enhancement in LTE-NR DC", Agenda Item: 10.2.4., 3GPP TSG RAN WG2 RN AdHoc, R2-1706991, Qingdao, China, Jun. 27-29, 2017.

Huawei et al., "Support of Multi-Connectivity in NR", Agenda Item: 10.2.3., 3GPP TSG RAN WG2 #97, R2-1701215, Athens, Greece, Feb. 13-17, 2017.

Huawei et al., "PDCP Duplication leftover enhancements to RLC", Agenda Item: 11.7.4., 3GPP TSG-RAN WG2 #105-bis, R2-1904897, Xi'an, China, Apr. 8-12, 2019.

Erricson, "PDCP duplication scenarios and dynamic PDCP duplication parameters", Agenda Item: 11.7.4., 3GPP TSG-RAN WG2 #105bis, Tdoc R2-1904060, Xi'an, China, Apr. 8-12, 2019.

First Notification of Office Action issued by the China National Intellectual Property Administration for corresponding Chinese Patent Application No. 201980094330.2, dated May 12, 2023, with an English translation.

* cited by examiner

BASE STATION, TERMINAL DEVICE, AND COMMUNICATION SYSTEM

CROSS-REFERENCE TO RELATED APPLICATION

This application is a continuation application of International Application PCT/JP2019/016886, filed on Apr. 19, 2019, and designating the U.S., the entire contents of which are incorporated herein by reference.

FIELD

The present invention relates to a base station, a terminal device, and a communication system.

BACKGROUND

In the current networks, traffic of mobile terminals (smartphones and feature phones) occupies most of network resources. Furthermore, traffic used by mobile terminals tends to be continuously increased in the future.

In contrast, with the development of Internet of things (IoT) services (for example, monitoring systems, such as transportation systems, smart meters, and devices), there is a need to cope with services having various request conditions. Thus, in the communication standards for the fifth generation mobile unit communication (5G or New Radio (NR)), in addition to the standard technology of the fourth generation mobile unit communication (4G), there is a demand for a technology that implements higher-data-rate, higher-capacity, and lower-delay communication. Furthermore, regarding the fifth generation communication standards, technical studies are being conducted in 3GPP working groups (for example, TSG-RAN WG1, TSG-RAN WG2, and the like), and the first edition of the standard specification was released at the end of 2017.

As described above, in order to respond various kinds of services, in 5G, support of a lot of use cases classified into eMBB, Massive MTC (or Massive IoT), and URLLC is conceived. Furthermore, eMBB is an abbreviation of enhanced Mobile Broadband, MTC is an abbreviation of Machine Type Communications, URLLC is an abbreviation of Ultra-Reliable and Low Latency Communication.

From among the use cases described above, URLLC is the most difficult use case to be implemented. First, there are demands of the error rate of $10^{-3}$ in a radio section, which is high reliability. As one method of implementing such high reliability, there is a method of increasing an amount of resources to be used and providing redundancy to data. However, an amount of radio resources to be used is limited and it is thus difficult to increase the resources to be used without limitation.

In addition, regarding a low delay, in URLLC, the aim of a delay in a radio section in a user plane in an uplink and a downlink is 0.5 milliseconds. This is a high request corresponding to less than 1/10 the delay requested in Long Term Evolution (LTE) that is a 4G radio system. In URLLC, there is a need to simultaneously satisfy the above described two requests, i.e., ultrahigh reliability and low delay.

As one method of satisfying these requests, there is a known technique called Packet Data Convergence Protocol (PDCP) Duplication (for example, see Non Patent Literature 1 below). In PDCP Duplication, a packet of a PDCP layer is duplicated among a plurality of base stations, and the duplicated packets are transmitted from the plurality of base stations to terminal devices. Consequently, it is possible to improve the reliability of receiving packets in the terminal devices and reduce the delay.

Each of the base stations transmits, if the transmission of the packets has been completed, a transmission completion notification related to the packet to the other base station. The base station that receives the transmission completion notification from the other base station before the completion of the transmission of the packet cancels the transmission of the packet. Consequently, useless transmission of the same packets is prevented. Conventional technique is described in 3GPP TS 38.300 V15.3.0 (2018 September).

Incidentally, various control signals are transmitted between the base stations. If congestion occurs in a network between the base stations, a loss of a control signal occurs. If the loss of the control signal occurs, it is difficult to perform a link operation between the base stations. Furthermore, if the loss of the control signal occurs, retransmission of the control signal or re-establishment of a communication path between the base stations is performed, so that a delay in transmission of the control signal is increased.

In PDCP Duplication, if the transmission of a packet has been completed in each of the base stations, a transmission completion notification related to the packet is transmitted to the other base station. However, depending on a processing status of the other base station, the transmission of the packet is completed before the transmission completion notification is received. In this case, the transmission of the transmission completion notification is accordingly useless. In the two base stations that perform PDCP Duplication, the transmission completion notification is transmitted from at least one of the base stations every time a packet is transmitted.

If a transmission completion notification is transmitted every time a packet is transmitted, the traffic in the network between the base stations is increased, and thus, in some cases, congestion may occur. Depending on a timing at which a packet is transmitted, there may be a case in which transmission completion notifications are transmitted from both of the base stations. In this case, the traffic in the network between the base stations is further increased.

Furthermore, the base station that has received the transmission completion notification needs to perform a process for checking whether the transmission of the packet has been completed. If the transmission of the packet has not been completed, it is possible to cancel the transmission of the packet; however, if the transmission of the packet has already been completed, a process for checking whether the transmission of the packet has been completed is useless. The transmission completion notification is transmitted from at least one of the base stations every time a packet is transmitted, so that the process for checking whether the transmission of the packet has been completed also needs to be performed in at least one of the base stations. Consequently, a processing load in each of the base stations is increased.

SUMMARY

According to an aspect of an embodiment, a base station includes a first reception unit, a first transmission unit, and a second transmission unit. The first reception unit receives information related to a communication processing state of another base station from the other base station. The first transmission unit transmits, to the other base station, duplication of data to be transmitted to a terminal device. The second transmission unit transmits the data to the terminal device by using radio communication. The first transmission unit transmits, after the transmission of the data performed by the second transmission unit has been completed, in accordance with the information related to the communication processing state, a transmission completion notification that indicates that the transmission of the data has been completed to the other base station.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

Preferred embodiments of a base station, a terminal device, and a communication system according to the embodiment disclosed in the present invention will be explained in detail with reference to accompanying drawings. Furthermore, the present invention is not limited to the embodiments.

Communication System 10

Figure 1:
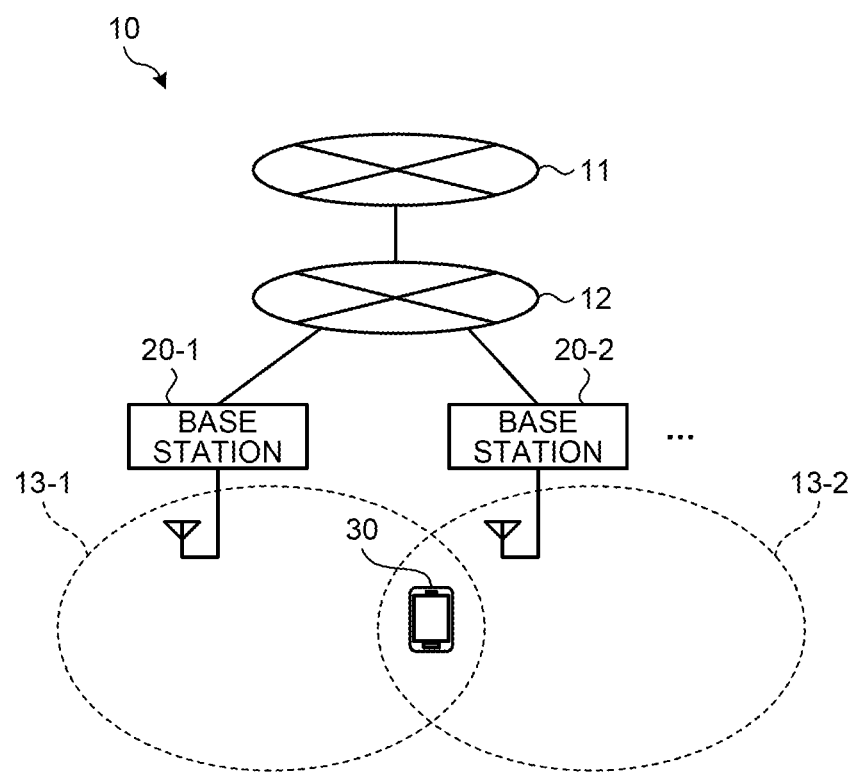
FIG. 1 is a diagram illustrating an example of a communication system.

FIG. 1 is a diagram illustrating an example of a communication system 10. The communication system 10 includes a plurality of base stations 20-1 and 20-2 and a terminal device 30. In the example illustrated in FIG. 1, the base station 20-1 forms a cell 13-1, whereas the base station 20-2 forms a cell 13-2. Furthermore, in a description below, the plurality of the base stations 20-1 and 20-2 are collectively referred to as a base station 20, if the base stations 20-1 and 20-2 do not need to be distinguished. Each of the base stations 20 is connected to a core network 11 via a network 12, controls a radio connection of the terminal device 30, and relays communication between the terminal device 30 and the core network 11.

In the embodiment, each of the two base station 20-1 and the base station 20-2 transmits the same packet to the terminal device 30 on the basis of PDCP Duplication. Furthermore, in the embodiment, in a process of PDCP Duplication, the base station 20-1 functions as a Master Cell Group (MCG), whereas the base station 20-2 functions as a Secondary Cell Group (SCG).

The terminal device 30 receives a packet from at least one of the two base station 20-1 and the base station 20-2. Consequently, even if a radio environment with one of the base stations 20 is poor, the terminal device 30 is able to receive the packet from the other base station 20, and it is thus possible to improve the reliability in receiving the packet by the terminal device 30. Furthermore, even if a delay in the packet is increased in one of the base stations 20, the terminal device 30 is able to receive the packet in low delay from the other base station 20, and it is thus possible to reduce the delay in the packet in the terminal device 30.

Configuration of MCG

Figure 2:
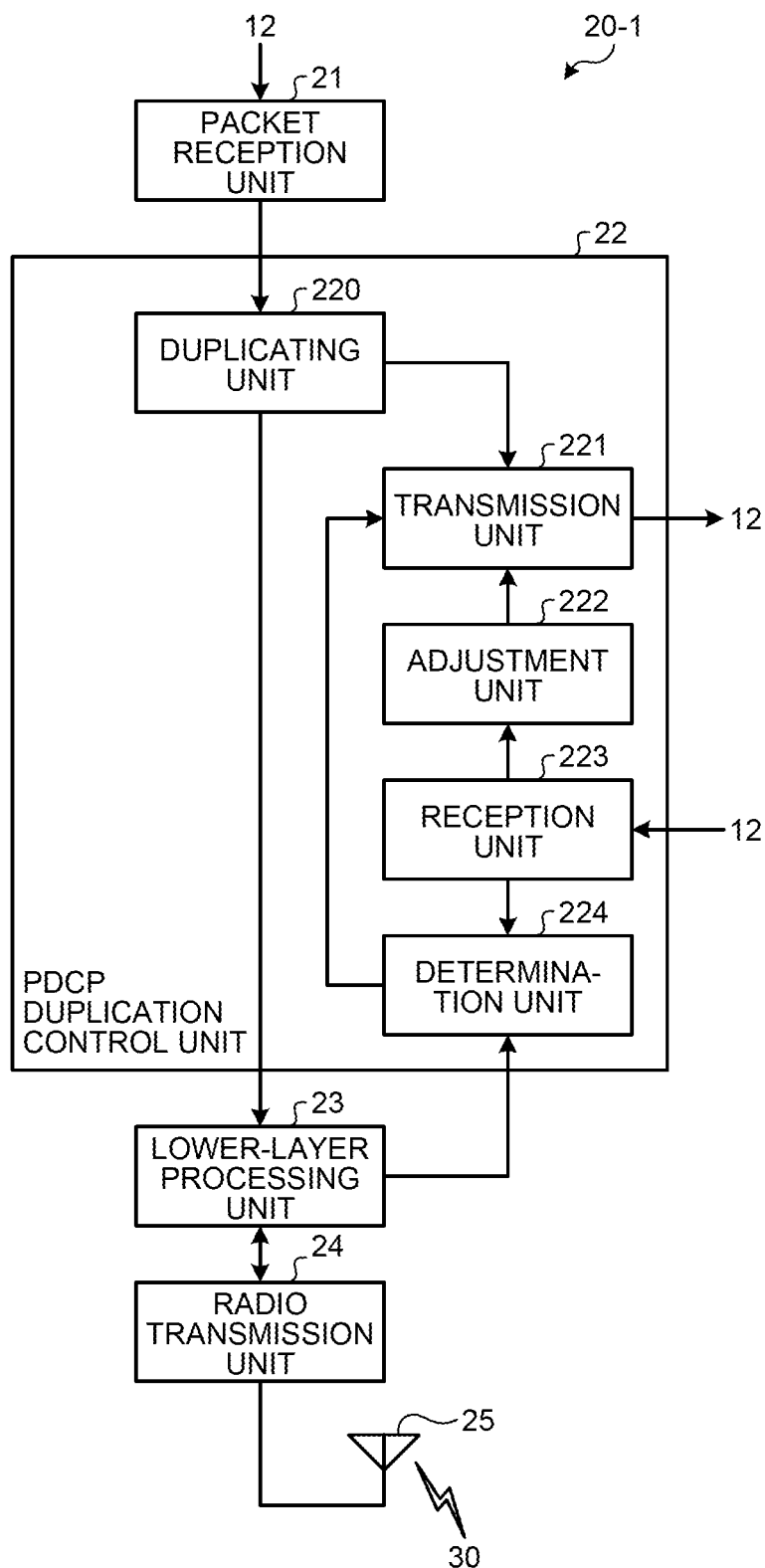
FIG. 2 is a block diagram illustrating an example of a base station that functions as a MCG.

FIG. 2 is a block diagram illustrating an example of the base station 20-1 that functions as the MCG. The base station 20-1 includes a packet reception unit 21, a PDCP Duplication control unit 22, a lower-layer processing unit 23, and a radio transmission unit 24.

The packet reception unit 21 receives a packet addressed to the terminal device 30 from the core network 11 via the network 12. Then, the packet reception unit 21 outputs the received packet to the PDCP Duplication control unit 22.

The PDCP Duplication control unit 22 performs a process related to PDCP Duplication with the base station 20-2 via the network 12.

The lower-layer processing unit 23 performs a process at a RLC layer and a MAC layer with respect to the packet that is output from the PDCP Duplication control unit 22, and then, outputs the processed packet to the radio transmission unit 24. Furthermore, if the lower-layer processing unit 23 receives a notification of transmission completion of the packet from the radio transmission unit 24, the lower-layer processing unit 23 notifies the PDCP Duplication control unit 22 of the transmission completion of the packet.

The radio transmission unit 24 performs a process at a physical layer, such as encoding or modulation, with respect to the packet that is output from the lower-layer processing unit 23, and then, transmits a processed signal as a radio signal to the terminal device 30 from an antenna 25. If the transmission of the packet that is output from the lower-layer processing unit 23 has been completed, the radio transmission unit 24 notifies the lower-layer processing unit 23 of the transmission completion.

The PDCP Duplication control unit 22 includes a duplicating unit 220, a transmission unit 221, an adjustment unit 222, a reception unit 223, and a determination unit 224. The duplicating unit 220 duplicates the packet that is output from the packet reception unit 21. Then, the duplicating unit 220 outputs the packet that is output from the packet reception unit 21 to the lower-layer processing unit 23, and then, outputs the duplicated packet to the transmission unit 221. The transmission unit 221 transmits the packet that is output from the duplicating unit 220 to the base station 20-2 via the network 12.

The adjustment unit 222 performs adjustment related to PDCP Duplication with the base station 20-2 via the transmission unit 221 and the reception unit 223. For example, the adjustment unit 222 determines whether to start PDCP Duplication, performs adjustment of a unit of process (for example, a unit of bearer, a unit of packet, time unit, etc.), or the like at the time of performing PDCP Duplication with the base station 20-2. Furthermore, the adjustment unit 222 adjusts, with the base station 20-2, the type of information notified as a communication processing state (for example, a load status, etc.), a condition for notifying of the information related to the communication processing state, or the like. Furthermore, in a description below, the load status is described as an example of the information related to the communication processing state; however, the information related to the communication processing state is not limited to the load status.

In the embodiment, examples of the information notified as the load status of the base station 20-2 includes a length of an average queue in the RLC layer, a success rate of Hybrid ARQ (HARQ) in the RLC layer, and a success rate of HARQ in the MAC layer. Furthermore, the information notified as the load status of the base station 20-2 may also include a usage rate of a memory or a processor of the base station 20-2, or the like.

Furthermore, in the embodiment, the load status is notified from the base station 20-2 at an interval of, for example, a predetermined period. Furthermore, as another example, the load status may also be notified from the base station 20-2 if the load status is changed by an amount greater than or equal to a predetermined value. Consequently, if a change in the load status is small, the load status is not notified and it is thus possible to suppress an increase in communication traffic.

If the reception unit 223 receives the load status from the base station 20-2 via the network 12, the reception unit 223 outputs the received load status to the determination unit 224.

The determination unit 224 holds the load status of the base station 20-2 that is output from the reception unit 223. If the determination unit 224 has already held data on the load status, the determination unit 224 updates the data on the holding load status with the data on the load status that is output from the reception unit 223. Furthermore, if the determination unit 224 is notified from the lower-layer processing unit 23 that the transmission of the packet to the terminal device 30 has been completed, the determination unit 224 determines whether the transmission of the duplicated packet has been completed in the base station 20-2. The determination whether the transmission of the duplicated packet has been completed is performed on the basis of, for example, the load status of the base station 20-1 and the load status of the base station 20-2 that is held by the radio transmission unit 24.

For example, the determination unit 224 calculates, on the basis of the load status of the base station 20-1, processing time t1 needed to transmit the packet performed by the lower-layer processing unit 23 and the radio transmission unit 24. Furthermore, the determination unit 224 calculates, on the basis of the holding load status of the base station 20-2, processing time t2 needed to transmit the packet performed by the base station 20-2. Then, if the determination unit 224 is notified from the lower-layer processing unit 23 that the transmission of the packet to the terminal device 30 has been completed, the determination unit 224 determines, by comparing the processing time t1 to the processing time t2, whether the transmission of the duplicated packet has been completed in the base station 20-2.

For example, if the processing time t2 is longer than the processing time t1, or, if the processing time t2 is longer than the processing time t1 by an amount greater than or equal to predetermined time, the determination unit 224 determines that the transmission of the duplicated packet has not been completed in the base station 20-2.

If it is determined that the transmission of the duplicated packet has not been completed in the base station 20-2, the determination unit 224 generates a transmission completion notification that indicates that the transmission of the packet has been completed, and then, outputs the notification to the transmission unit 221. The transmission unit 221 transmits the transmission completion notification that is output from the determination unit 224 to the base station 20-2 via the network 12.

Figure 3:
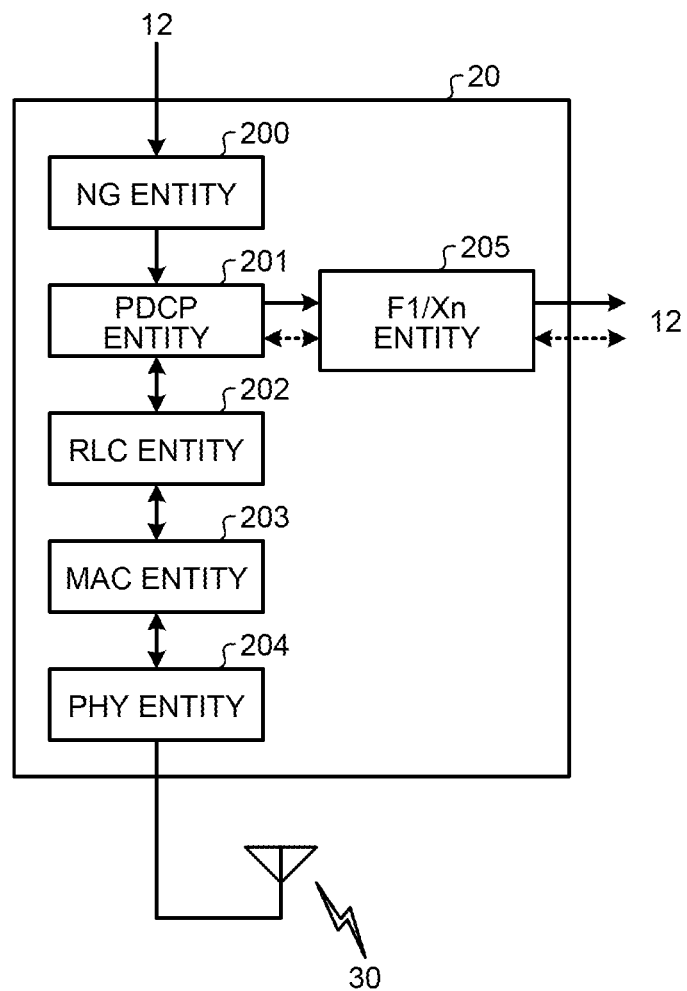
FIG. 3 is a diagram illustrating an example of a functional configuration of a base station for each layer.

FIG. 3 is a diagram illustrating an example of a functional configuration of the base station 20 for each layer. The base station 20 includes a NG Entity 200, a PDCP Entity 201, a RLC Entity 202, a MAC Entity 203, a PHY Entity 204, and a F1/Xn Entity 205.

The packet reception unit 21 is implemented by, for example, the NG Entity 200. The duplicating unit 220, the adjustment unit 222, and the determination unit 224 included in the PDCP Duplication control unit 22 are implemented by, for example, the PDCP Entity 201. The transmission unit 221 and the reception unit 223 included in the PDCP Duplication control unit 22 are implemented by, for example, the F1/Xn Entity 205. The lower-layer processing unit 23 is implemented by, for example, the RLC Entity 202 and the MAC Entity 203. The radio transmission unit 24 is implemented by, for example, the PHY Entity 204.

The packet duplicated by the duplicating unit 220 is transmitted via, for example, an F1 interface (the solid line arrow illustrated in FIG. 3) of the F1/Xn Entity 205. Furthermore, the load status or the transmission completion notification is transmitted or received by, for example, an Xn interface (the dotted line arrow illustrated in FIG. 3) of the F1/Xn Entity 205. In the F1 interface and the Xn interface, for example, a Stream Control Transmission Protocol (SCTP) is used as a protocol at the transport layer.

Configuration of SCG

Figure 4:
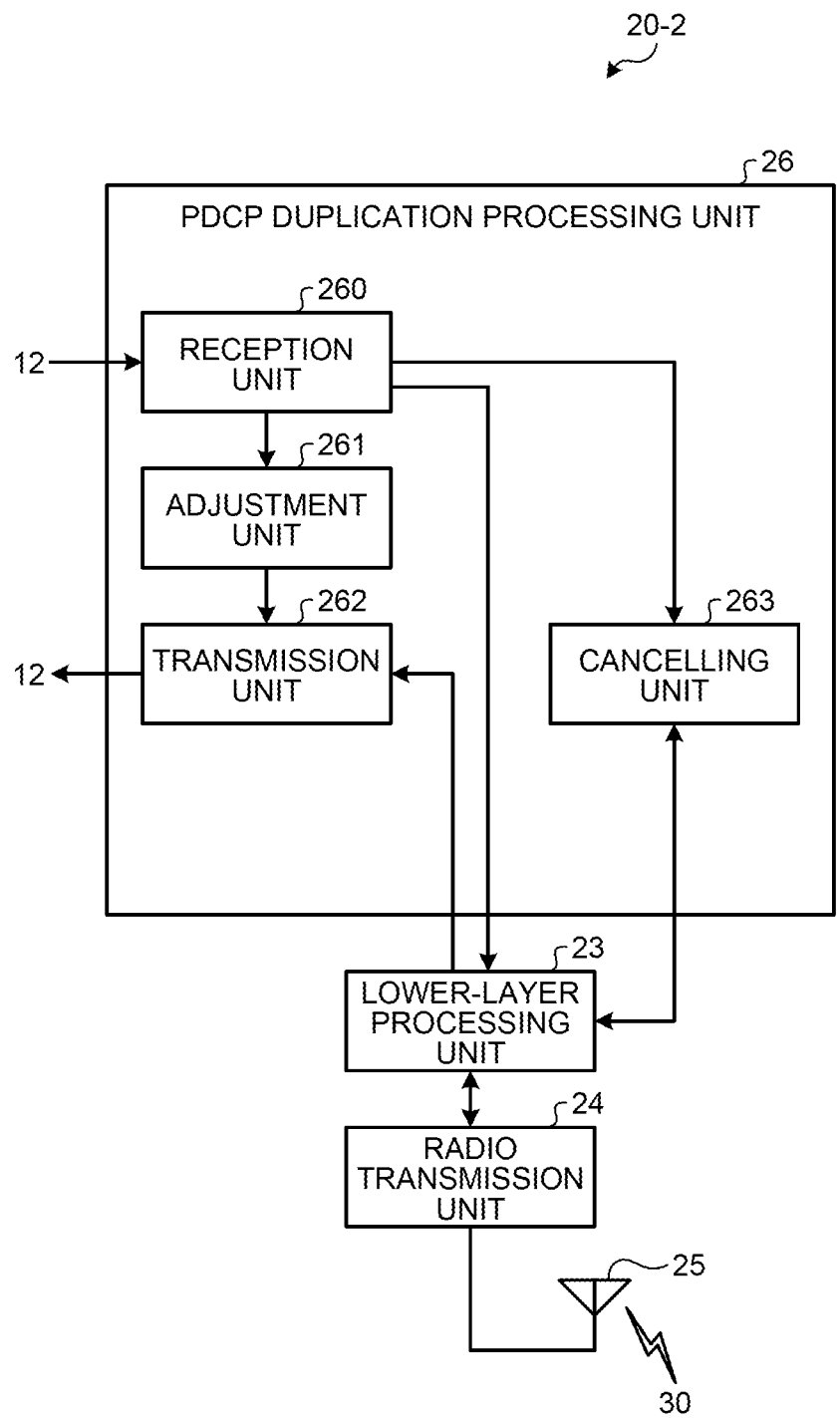
FIG. 4 is a block diagram illustrating an example of a base station that functions as a SCG.

FIG. 4 is a block diagram illustrating an example of the base station 20-2 that functions as the SCG. The base station 20-2 includes the lower-layer processing unit 23, the radio transmission unit 24, and a PDCP Duplication processing unit 26. Furthermore, in FIG. 4, the blocks assigned by the same reference numerals as those illustrated in FIG. 2 are the same blocks as those described with reference to FIG. 2; therefore overlapping descriptions thereof will be omitted except for the descriptions below.

The PDCP Duplication processing unit 26 performs a process related to PDCP Duplication with the base station 20-1. The PDCP Duplication processing unit 26 includes a reception unit 260, an adjustment unit 261, a transmission unit 262, and a cancelling unit 263.

The adjustment unit 261 performs adjustment related to PDCP Duplication with the base station 20-1 via the reception unit 260 and the transmission unit 262. For example, the adjustment unit 261 adjusts, with the base station 20-1, a unit of process at the time of performing PDCP Duplication, a type of information notified as a load status, a condition for notifying of the load status, or the like. Then, the adjustment unit 261 outputs the adjusted condition to the transmission unit 262.

The transmission unit 262 holds the condition for notifying of the load status that is output from the adjustment unit 261. Then, if the holding condition is satisfied, the transmission unit 262 acquires the load status of the base station 20-2 and transmits the acquired load status to the base station 20-1 via the network 12. If the information on the RLC layer or the MAC layer is acquired as the load status, the transmission unit 262 acquires the load status from the lower-layer processing unit 23.

Furthermore, the base station 20-2 has also have the functional configuration exemplified in, for example, FIG. 3. The adjustment unit 261 and the cancelling unit 263 included in the PDCP Duplication processing unit 26 are implemented by, for example, the PDCP Entity 201, whereas the reception unit 260 and the transmission unit 262 included in the PDCP Duplication processing unit 26 are implemented by, for example, the F1/Xn Entity 205. Furthermore, the lower-layer processing unit 23 is implemented by, for example, the RLC Entity 202 and the MAC Entity 203, and the radio transmission unit 24 is implemented by, for example, the PHY Entity 204.

If the transmission unit 262 acquires information on the RLC layer as the load status, the F1/Xn Entity 205 acquires information on the RLC layer from the RLC Entity 202 via, for example, the PDCP Entity 201. Furthermore, if the transmission unit 262 acquires information on the MAC layer as the load status, the F1/Xn Entity 205 acquires information on the MAC layer from the MAC Entity 203 via, for example, the PDCP Entity 201 and the RLC Entity 202.

Furthermore, the F1/Xn Entity 205 may also construct an interface for acquiring the information on the RLC layer with the RLC Entity 202 and acquire the information on the RLC layer from the RLC Entity 202 without passing through the PDCP Entity 201. Furthermore, the F1/Xn Entity 205 may also construct an interface for acquiring the information on the MAC layer with the MAC Entity 203 and acquire the information on the MAC layer from the MAC Entity 203 without passing through the PDCP Entity 201 and the RLC Entity 202.

If the reception unit 260 receives the duplicated packet from the base station 20-1 via the network 12, the reception unit 260 outputs the received packet to the lower-layer processing unit 23. The lower-layer processing unit 23 and the radio transmission unit 24 performs a process at the lower layers with respect to the packet that is output from the reception unit 260, and then, transmits the processed packet via the antenna 25 using radio transmission.

Furthermore, if the reception unit 260 receives a transmission completion notification from the base station 20-1 via the network 12, the reception unit 260 outputs the received transmission completion notification to the cancelling unit 263. If the transmission completion notification is output from the reception unit 260, the cancelling unit 263 makes an inquiry at the lower-layer processing unit 23 whether the transmission of the packet has been completed. If the transmission of the packet has not been completed, the cancelling unit 263 instructs the lower-layer processing unit 23 to cancel the transmission of the packet. The lower-layer processing unit 23 cancels the transmission by deleting, from a transmission queue, the packet that is instructed by the cancelling unit 263 to cancel the transmission. Consequently, it is possible to prevent the same packet as that transmitted from the base station 20-1 from being transmitted to the terminal device 30 in an overlapping manner, and it is thus possible to suppress useless consumption of the radio resources.

Furthermore, if the transmission completion notification is output from the reception unit 260, the cancelling unit 263 may also instruct the lower-layer processing unit 23 to cancel the transmission of the packet without making an inquiry at the lower-layer processing unit 23 whether the transmission of the packet has been completed.

Configuration of Terminal Device 30

Figure 5:
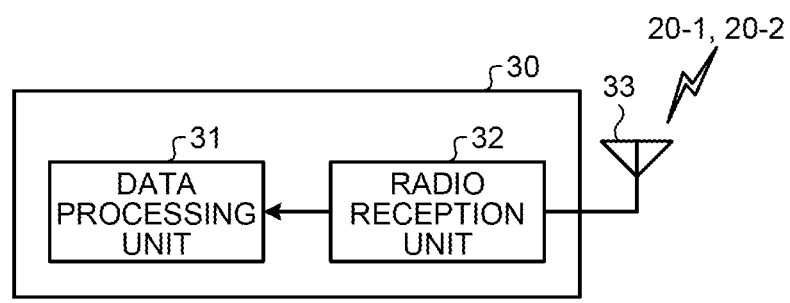
FIG. 5 is a block diagram illustrating an example of a terminal device.

FIG. 5 is a block diagram illustrating an example of the terminal device 30. The terminal device 30 includes a data processing unit 31, a radio reception unit 32, and an antenna 33.

The radio reception unit 32 receives a packet transmitted by using radio transmission from at least one of the base station 20-1 and the base station 20-2 via the antenna 33, and then, outputs the received packet to the data processing unit 31. The data processing unit 31 performs a predetermined process on the basis of the data included in the packet that is output from the radio reception unit 32.

Process Performed by Communication System 10

Figure 6:
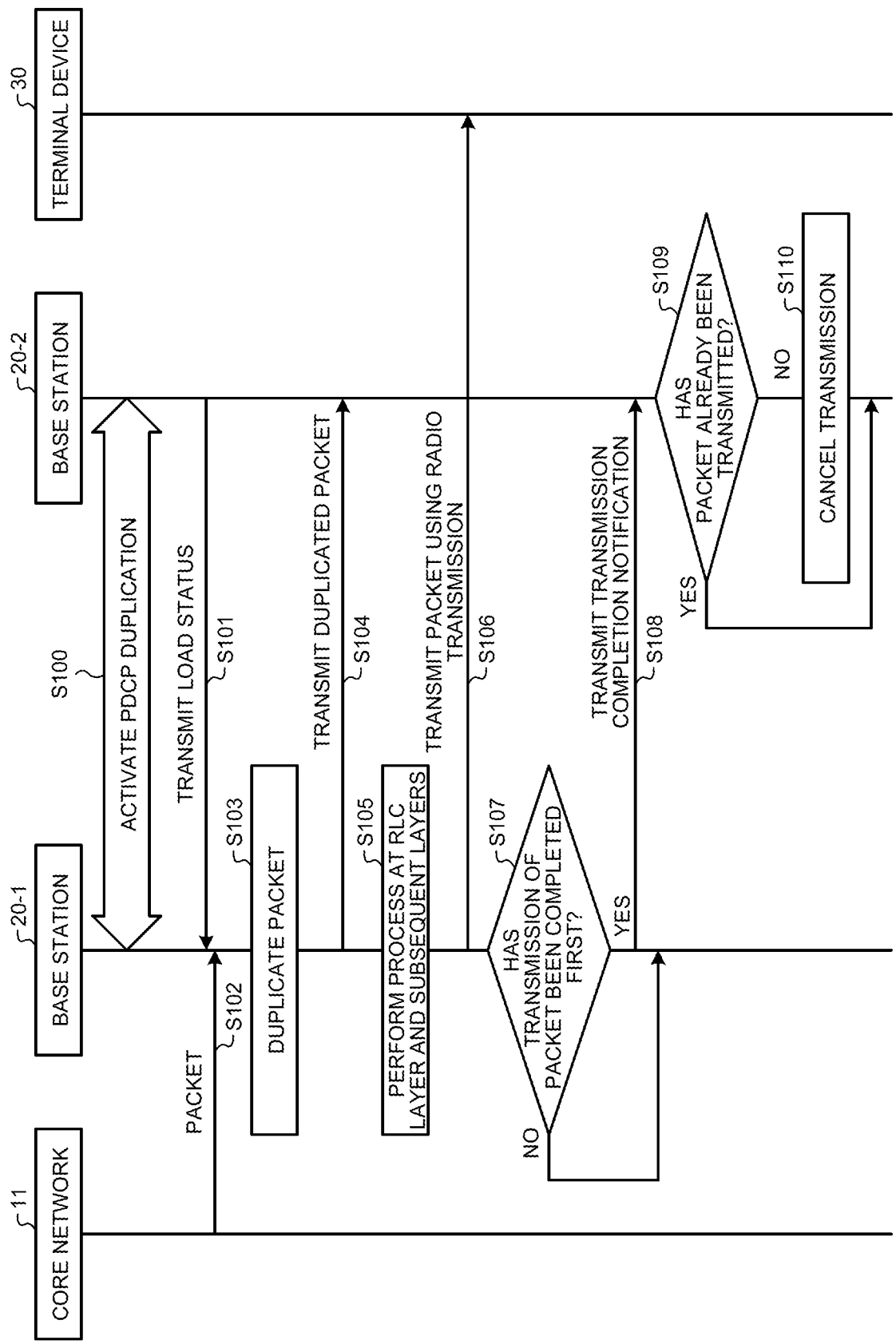
FIG. 6 is a sequence diagram illustrating an example of a process performed by the communication system in PDCP Duplication.

FIG. 6 is a sequence diagram illustrating an example of a process performed by the communication system 10 on the basis of PDCP Duplication.

First, PDCP Duplication is activated between the base station 20-1 and the base station 20-2 (S100). At Step S100, a unit of process that is used at the time of performing PDCP Duplication, the type of information notified as the load status, a condition for notifying of the load status, or the like are adjusted between the base station 20-1 and the base station 20-2.

Then, if the condition adjusted with the base station 20-1 is satisfied, the base station 20-2 transmits the load status of the base station 20-2 to the base station 20-1 (S101).

Then, the base station 20-1 receives a packet addressed to the terminal device 30 from the core network 11 (S102). The base station 20-1 duplicates the received packet (S103), and transmits the duplicated packet to the base station 20-2 (S104). The base station 20-2 that has been received the duplicated packet starts the process at the RLC layer and the subsequent layers with respect to the duplicated packet.

Then, the base station 20-1 performs the process at the RLC layer and the subsequent layers with respect to the packet that is received from the core network 11 (S105). Then, the base station 20-1 transmits the packet that has been subjected to the RLC layer and the subsequent layers to the terminal device 30 using radio transmission (S106).

Then, the base station 20-1 determines, on the basis of the load status of the base station 20-1 and the load status received from the base station 20-2 at Step S101, whether the transmission of the packet has been completed earlier than the base station 20-2 (S107).

If it is determined that the transmission of the packet has been completed earlier than the base station 20-2 (Yes at S107), the base station 20-1 transmits the transmission completion notification to the base station 20-2 (S108). In contrast, if it is determined that the base station 20-2 has completed the transmission of the packet first (No at S107), the base station 20-1 does not transmit the transmission completion notification to the base station 20-2. Consequently, it is possible to suppress useless transmission of the transmission completion notification.

The base station 20-2 that receives the transmission completion notification determines whether transmission of the received packet has been completed at Step S104 (S109). If the transmission of the packet has not been completed (No at S109), the base station 20-2 cancels the transmission of the packet that is received at Step S104 (S110). In contrast, if the transmission of the packet has been completed (Yes at S109), the base station 20-2 does not cancel the transmission of the packet.

Operation of MGC

Figure 7:
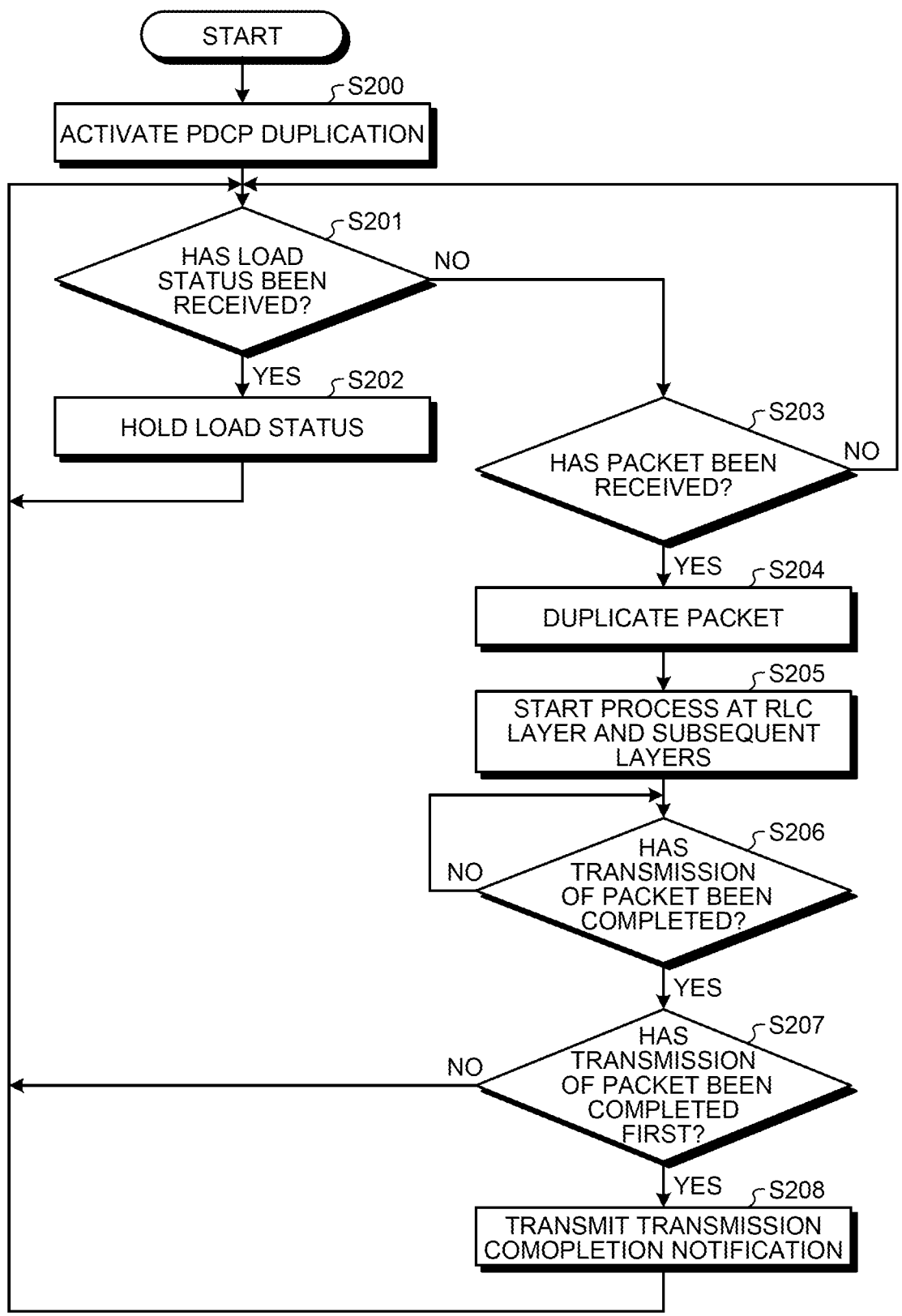
FIG. 7 is a flowchart illustrating an example of an operation of the base station functioning as the MCG.

FIG. 7 is a flowchart illustrating an example of an operation of the base station 20-1 that functions as the MCG. For example, if it is determined that the adjustment unit 222 included in the base station 20-1 starts PDCP Duplication, the base station 20-1 starts the operation indicated by the flowchart.

First, the adjustment unit 222 activates PDCP Duplication with the base station 20-2 (S200). Then, the adjustment unit 222 adjusts, with the base station 20-2, a unit of process that is used at the time of PDCP Duplication, the type of information notified as the load status, a condition for notifying of the load status, or the like.

Then, the reception unit 223 determines whether the load status has been received from the base station 20-2 via the network 12 (S201). If the load status is received (Yes at S201), the reception unit 223 outputs the received load status to the determination unit 224. The determination unit 224 holds the load status that is output from the reception unit 223 (S202). Then, the process indicated at Step S201 is performed again.

If the reception unit 223 does not receive the load status (No at S201), the packet reception unit 21 determines whether the packet addressed to the terminal device 30 has been received from the core network 11 via the network 12 (S203). If the packet addressed to the terminal device 30 has not been received from the core network 11 (No at S203), the process indicated at Step S201 is performed again.

In contrast, if the packet addressed to the terminal device 30 has been received from the core network 11 (Yes at S203), the packet reception unit 21 outputs the received packet to the PDCP Duplication control unit 22. The duplicating unit 220 included in the PDCP Duplication control unit 22 duplicates the packet that is output from the packet reception unit 21 (S204). Then, the duplicating unit 220 outputs the packet that is output from the packet reception unit 21 to the lower-layer processing unit 23, and then, outputs the duplicated packet to the transmission unit 221. The transmission unit 221 transmits the packet that is output from the duplicating unit 220 to the base station 20-2 via the network 12.

Then, the lower-layer processing unit 23 starts the process at the RLC layer and the subsequent layers with respect to the packet that is output from the PDCP Duplication control unit 22 (S205). Then, the determination unit 224 determines, by determining whether the transmission completion is notified from the lower-layer processing unit 23, whether the transmission of the packet has been completed (S206). If the transmission of the packet has not been completed (No at S206), the process at Step S206 is again performed.

In contrast, if the transmission of the packet has been completed (Yes at S206), the determination unit 224 determines, on the basis of the load status of the base station 20-1 and the holding load status of the base station 20-2, whether the transmission of the packet has been completed earlier than the base station 20-2 (S207). If it is determined that the base station 20-2 has completed the transmission of the packet first (No at S207), the process indicated at Step S201 is again performed.

In contrast, if it is determined that the transmission of the packet has been completed earlier than the base station 20-2 (Yes at S207), the determination unit 224 generates a transmission completion notification and outputs the generated transmission completion notification to the transmission unit 221. The transmission unit 221 transmits the transmission completion notification that is output from the determination unit 224 to the base station 20-2 via the network 12 (S208). Then, the process indicated at Step S201 is again performed.

Operation of SGC

Figure 8:
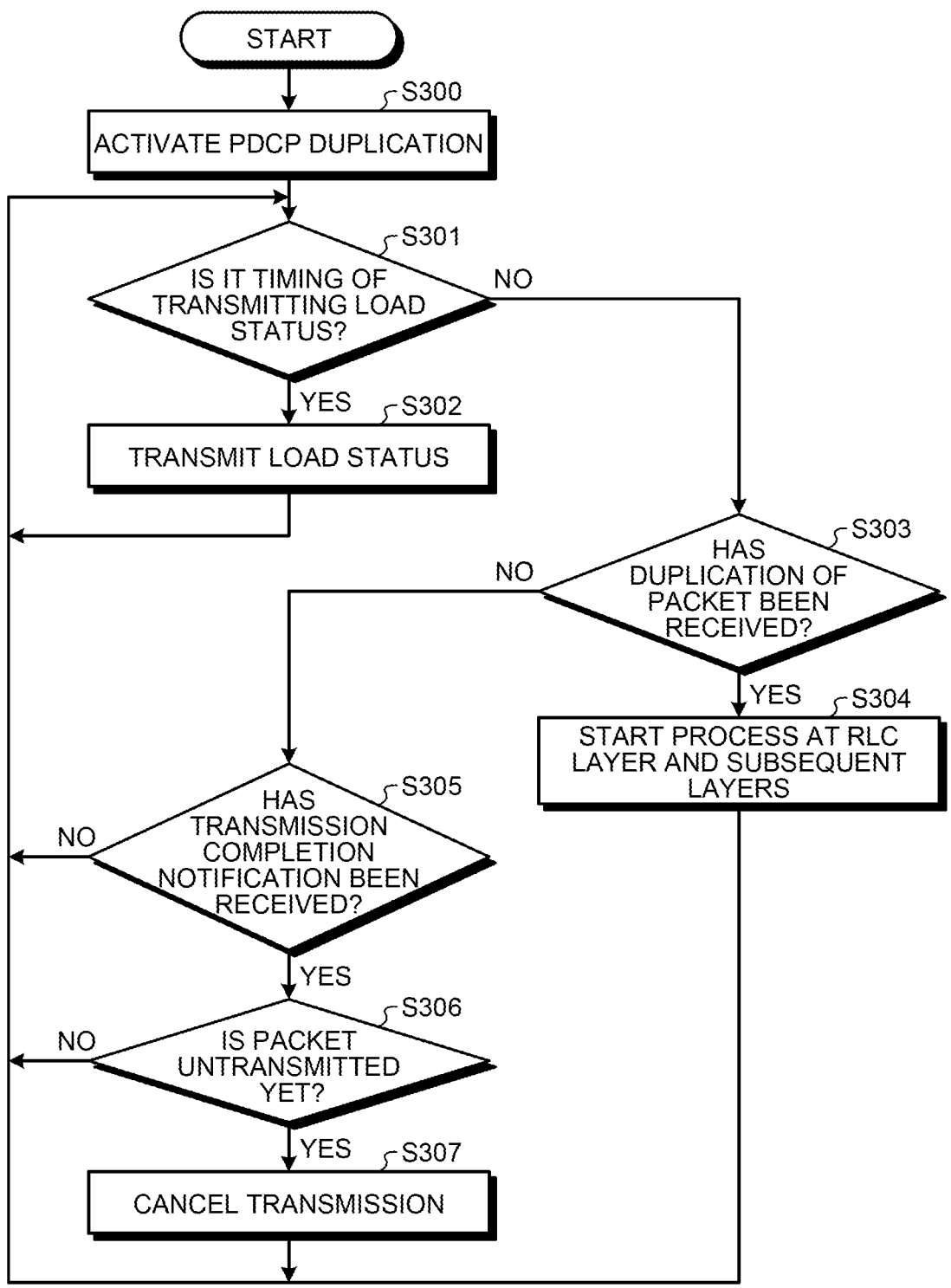
FIG. 8 is a flowchart illustrating an example of an operation of the base station functioning as the SCG.

FIG. 8 is a flowchart illustrating an example of an operation of the base station 20-2 that functions as the SCG. For example, the adjustment unit 261 included in the base station 20-2 is instructed by the base station 20-1 to start PDCP Duplication, the base station 20-2 starts the operation indicated by the flowchart.

First, the adjustment unit 261 activates PDCP Duplication with the base station 20-1 (S300). Then, the adjustment unit 261 adjusts, with the base station 20-1, a unit of process at the time of PDCP Duplication performed, the type of information notified as the load status, the condition for notifying of the load status, or the like. Then, the adjustment unit 261 notifies the transmission unit 262 of the condition for notifying of the load status.

Then, the transmission unit 262 determines, by determining whether the condition notified from the adjustment unit 261 is satisfied, whether it is a timing of transmitting the load status (S301). If it is the timing of transmitting the load status (Yes at S301), the transmission unit 262 acquires the load status of the base station 20-2 and transmits the acquired load status to the base station 20-1 via the network 12 (S302). Then, the process indicated at Step S301 is again performed.

If it is not a timing of transmitting the load status (No at S301), the reception unit 260 determines whether duplication of the packet has been received from the base station 20-1 (S303). If duplication of the packet has been received (Yes at S303), the reception unit 260 outputs the received packet to the lower-layer processing unit 23. The lower-layer processing unit 23 starts the process at the RLC layer and the subsequent layers with respect to the packet that is output from the PDCP Duplication processing unit 26 (S304). Then, the process indicated at Step S301 is again performed.

If the reception unit 260 has not received duplication of the packet (No at S303), the reception unit 260 determines whether the transmission completion notification has been received from the base station 20-1 (S305). If the transmission completion notification has not been received (No at S305), the process indicated at Step S301 is again performed.

If the transmission completion notification has been received from the base station 20-1 (Yes at S305), the reception unit 260 outputs the transmission completion notification to the cancelling unit 263. The cancelling unit 263 determines whether the packet has not been transmitted by making an inquiry at the lower-layer processing unit 23 whether the packet is not yet transmitted (S306). If the packet has already been transmitted (No at S306), that process as Step S301 is again performed.

In contrast, if the packet is not yet transmitted (Yes at S306), the cancelling unit 263 instructs the lower-layer processing unit 23 to cancel the transmission of the packet. The lower-layer processing unit 23 cancels the transmission by deleting, from the transmission queue, the packet that is instructed by the cancelling unit 263 to cancel the transmission (S307). Then, the process indicated at Step S301 is again performed.

Hardware

Figure 9:
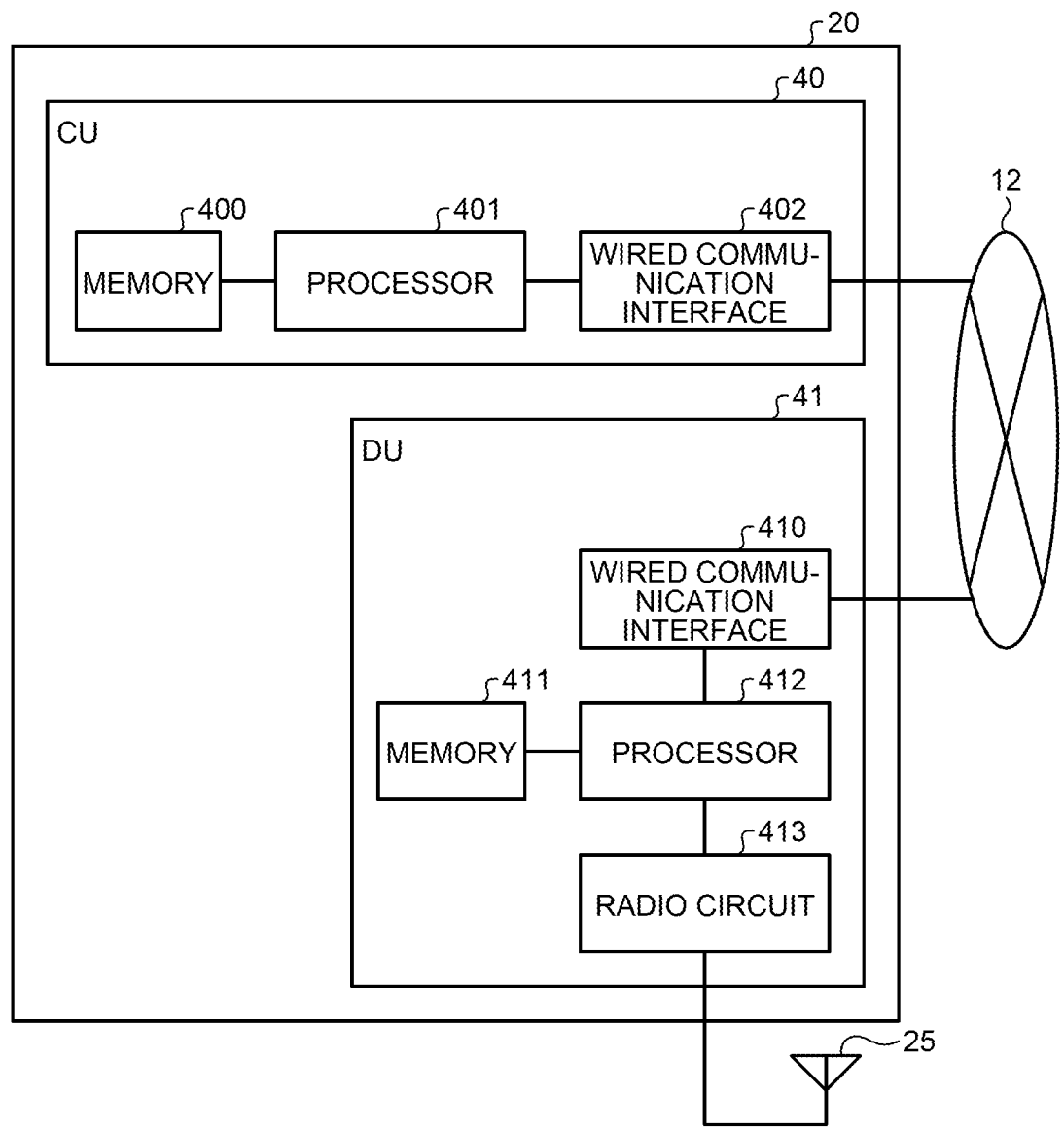
FIG. 9 is a diagram illustrating an example of hardware of the base station.

The base station 20-1 and the base station 20-2 are implemented by hardware illustrated in, for example, FIG. 9. FIG. 9 is a diagram illustrating an example of hardware of the base station 20. The base station 20 includes a central unit (CU) 40 and a distributed unit (DU) 41.

If the base station 20 functions as, for example, the MCG, the CU 40 implements the function of, for example, the packet reception unit 21 and the PDCP Duplication control unit 22, whereas the DU 41 implements the function of, for example, the lower-layer processing unit 23, and the radio transmission unit 24. Furthermore, if the base station 20 functions as, for example, the SCG, the CU 40 implements the function of, for example, the PDCP Duplication processing unit 26, whereas the DU 41 implements the function of for example, the lower-layer processing unit 23 and the radio transmission unit 24. Furthermore, the functions of both of the MCG and the SCG may also be provided in the single base station 20.

The CU 40 includes a memory 400, a processor 401, and a wired communication interface 402. The wired communication interface 402 is an interface for performing wired communication among the DU 41, the core network 11, and the other base station 20 via the network 12. The memory 400 stores therein various kinds of program, data, or the like for implementing the functions of the packet reception unit 21, the PDCP Duplication control unit 22, the PDCP Duplication processing unit 26, and the like. The processor 401 implements the functions of, for example, the packet reception unit 21, the PDCP Duplication control unit 22, the PDCP Duplication processing unit 26, and the like by reading programs from the memory 400 and executing the read program.

Furthermore, all programs, data, or the like stored in the memory 400 need not always be stored in the memory 400 from the beginning. For example, a portable recording medium, such as a memory card that stores therein the programs, the data, and the like, may be inserted into the CU 40 and the processor 401 may also appropriately acquire each of the programs, the data, or the like from the portable recording medium and execute the program, the data, or the like. Furthermore, the processor 401 may also acquire each of the programs or the like from another computer, a server device, or the like that stores therein the programs, the data, or the like via a radio communication line, a public line, the Internet, a LAN, a WAN, or the like.

The DU 41 includes a wired communication interface 410, a memory 411, a processor 412, and a radio circuit 413. The wired communication interface 410 is an interface for performing wired communication with the CU 40, the core network 11, and the other base station 20 via the network 12. Furthermore, the wired communication interface 402 included in the CU 40 and the wired communication interface 410 included in the DU 41 may also communicate with each other in the base station 20 without passing through the network 12.

The memory 411 stores therein various kinds of programs, data, or the like for implementing the functions of the lower-layer processing unit 23, the radio transmission unit 24, and the like. The processor 412 implements the functions of, for example, the lower-layer processing unit 23, the radio transmission unit 24, and the like by reading a program from the memory 411 and executing the read program. The radio circuit 413 transmits and receives a radio signal to and from the terminal device 30 via the antenna 25 in accordance with the control performed by the processor 412.

Furthermore, all programs, data, or the like stored in the memory 411 need not always be stored in the memory 411 from the beginning. For example, a portable recording medium, such as a memory card that stores therein the programs, the data, and the like, may be inserted into the DU 41 and the processor 412 may also appropriately acquire each of the programs, the data, or the like from the portable recording medium and execute the program, the data, or the like. Furthermore, the processor 412 may also acquire each of the programs or the like from another computer, a server device, or the like that stores therein the programs, the data, or the like via a radio communication line, a public line, the Internet, a LAN, a WAN, or the like.

Furthermore, a memory and a processor are provided in each of the CU 40 and the DU 41 exemplified in FIG. 9; however, two or more memories and processors may also be provided in each of the CU 40 and the DU 41. Furthermore, the CU 40 and the DU 41 may also be implemented by some of computational resources having a plurality of memories and processors.

Figure 10:
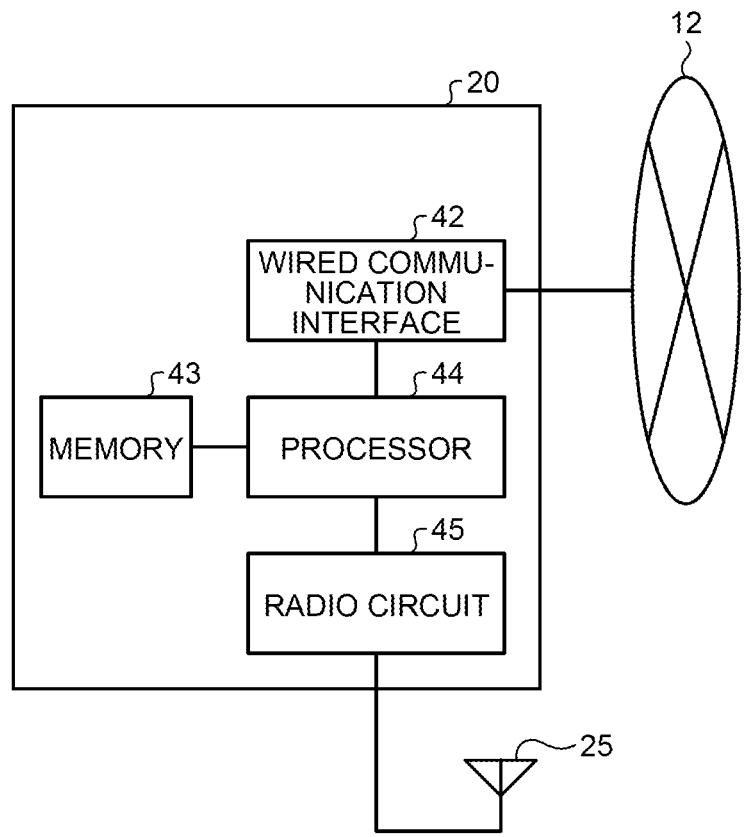
FIG. 10 is a diagram illustrating another example of hardware of the base station.

Furthermore, in the example illustrated in FIG. 9, the base station 20 includes the CU 40 and the DU 41; however, as another example, the base station 20 may also have the configuration illustrated in, for example, FIG. 10. FIG. 10 is a diagram illustrating another example of hardware of the base station 20. The base station 20 illustrated in FIG. 10 includes a wired communication interface 42, a memory 43, a processor 44, and a radio circuit 45.

The wired communication interface 42 is an interface for performing wired communication with the core network 11 and the other base station 20 via the network 12. The memory 43 stores therein various kinds of programs, data, or the like for implementing functions of the packet reception unit 21, the PDCP Duplication control unit 22, the lower-layer processing unit 23, the radio transmission unit 24, the PDCP Duplication processing unit 26, and the like. The processor 44 implements the functions of, for example, the packet reception unit 21, the PDCP Duplication control unit 22, the lower-layer processing unit 23, the radio transmission unit 24, the PDCP Duplication processing unit 26, and the like by reading a program from the memory 43 and executing the read program. The radio circuit 45 transmits and receives a radio signal to and from the terminal device 30 via the antenna 25 in accordance with the control of the processor 44.

Figure 11:
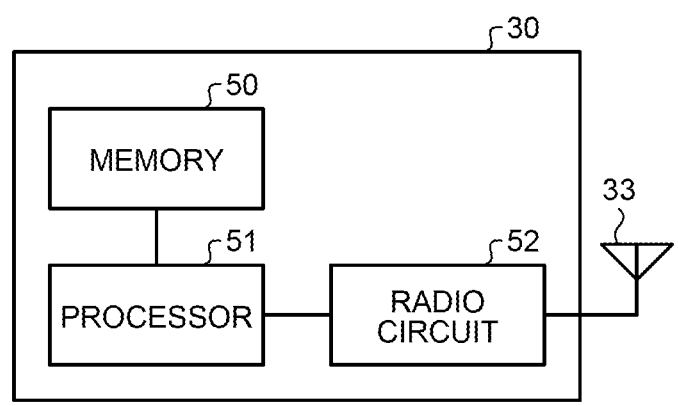
FIG. 11 is a diagram illustrating an example of hardware of the terminal device.

Furthermore, the terminal device 30 described above is implemented by the hardware illustrated in, for example, FIG. 11. FIG. 11 is a diagram illustrating an example of hardware of the terminal device 30. The terminal device 30 includes a memory 50, a processor 51, and a radio circuit 52.

The memory 50 stores therein various kinds of programs, data, or the like for implementing the functions of the data processing unit 31 and the like. The processor 51 implements the functions of, for example, the data processing unit 31 or the like by reading a program from the memory 50 executing the read program. The radio circuit 52 transmits and receives a radio signal to and from the base station 20 via the antenna 33 in accordance with the processor 51.

In the above, one embodiment has been described. As described above, the base station 20-1 according to the embodiment includes the transmission unit 221, the reception unit 223, and the radio transmission unit 24. The reception unit 223 receives information related to the communication processing state of the other base station 20-2 from the other base station 20-2. The transmission unit 221 transmits, to the other base station 20-2, duplication of data to be transmitted to the terminal device 30. The radio transmission unit 24 transmits the data to the terminal device 30 by using radio communication. Furthermore, after the transmission of the data performed by the radio transmission unit 24 has been completed, the transmission unit 221 transmits, in accordance with the information related to the communication processing state of the other base station 20-2, a transmission completion notification indicating that the transmission of the data has been completed to the other base station 20-2. Consequently, it is possible to suppress an increase in traffic between the base stations 20. Furthermore, by suppressing the transmission of the transmission completion notification, it is possible to reduce, in each of the base stations 20, execution frequency of processes for checking whether transmission of a packet has been completed. Consequently, it is possible to reduce a processing load applied to each of the base stations 20.

Furthermore, in the embodiment described above, after the transmission of the data performed by the radio transmission unit 24 has been completed, if it is determined, on the basis of the information related to the communication processing state, that the transmission of duplication of the data to the terminal device 30 has not been completed by the other base station 20-2, the transmission unit 221 transmits the transmission completion notification indicating that the transmission of the data has been completed to the base station 20-2. Consequently, it is possible to suppress useless transmission of the transmission completion notification.

Furthermore, in the embodiment described above, the information related to the communication processing state includes information that indicates a load status of the processing unit that processes at least one of the RLC layer and the MAC layer in the other base station 20-2. Consequently, it is possible to determine, on the basis of the information related to the communication processing state of the other base station 20-2, whether transmission of the duplication of data to the terminal device 30 performed by the other base station 20-2 has been completed.

Furthermore, in the embodiment described above, the reception unit 223 may also periodically receive, from the other base station 20-2, the information related to the communication processing state of the other base station 20-2. Consequently, it is possible to accurately determine, on the basis of the communication processing state of the other base station 20-2, whether the transmission of the duplication of the data to the terminal device 30 performed by the other base station 20-2 has been completed.

Furthermore, in the embodiment described above, if the communication processing state of the other base station 20-2 is changed by an amount greater than or equal to a predetermined level, the reception unit 223 receives the information related to the communication processing state of the other base station 20-2. Consequently, it is possible to suppress an increase in traffic between the base stations 20.

Furthermore, the base station 20-2 according to the embodiment described above includes the reception unit 260, the transmission unit 262, and the radio transmission unit 24. The transmission unit 262 transmits the information related to the communication processing state of the own device to the other base station 20-1. The reception unit 260 receives, from the other base station 20-1, duplication of data to be transmitted to the terminal device 30. The radio transmission unit 24 transmits the duplication of the data to the terminal device 30 by using radio communication. Furthermore, the reception unit 260 receives, from the other base station 20-1, the transmission completion notification that indicates that the transmission of the data has been completed. Furthermore, if the reception unit 260 receives the transmission completion notification from the other base station 20-1 before the transmission of the duplication of the data to the terminal device 30 is completed, the radio transmission unit 24 cancels the transmission of the duplication of the data to the terminal device 30. Consequently, it is possible to suppress useless consumption of the radio resources.

Furthermore, in the embodiment described above, the transmission unit 262 periodically transmits the information related to the communication processing state of the own device to the other base station 20-1. Consequently, the other base station 20-1 is able to accurately determine, on the basis of the information related to the communication processing state of the base station 20-2, whether the transmission of the duplication of the data to the terminal device 30 performed by the base station 20-2 has been completed.

Furthermore, in the embodiment described above, if the communication processing state of the own device is changed by an amount greater than or equal to a predetermined level, the transmission unit 262 transmits the information of the communication processing state of the own device to the other base station 20-1. Consequently, it is possible to suppress an increase in traffic between the base stations 20.

Others

Furthermore, the technology disclosed in the present invention is not limited to the embodiments described above and various modifications are possible as long as they do not depart from the spirit of the present invention.

For example, in the embodiment described above, if the transmission of the packet has been completed, the base station 20-1 determines, on the basis of the information related to the communication processing state received from the base station 20-2, whether the packet is not yet transmitted from the base station 20-2. Then, if it is determined that the packet is not yet transmitted from the base station 20-2, the base station 20-1 transmits the transmission completion notification to the base station 20-2. However, the disclosed technology is not limited to this.

For example, the base station 20-1 may also notify the base station 20-2 of the information related to the communication processing state of the base station 20-1 for each predetermined timing. Then, if the transmission of the packet has been completed, the base station 20-2 may also determine, on the basis of the information related to the communication processing state received from the base station 20-1, whether the packet is not yet transmitted from the base station 20-1, and, if it is determined that the packet is not yet transmitted, the base station 20-2 may also transmit the transmission completion notification to the base station 20-1.

If the reception unit 223 included in the base station 20-1 receives the transmission completion notification transmitted from the base station 20-2, the reception unit 223 outputs the received transmission completion notification to the determination unit 224. If the transmission completion notification is output from the reception unit 223, the determination unit 224 makes an inquiry at the lower-layer processing unit 23 whether the transmission of the packet has been completed. If the transmission of the packet has not been completed, the determination unit 224 instructs the lower-layer processing unit 23 to cancel the transmission of the packet. The lower-layer processing unit 23 cancels the transmission by deleting, from the transmission queue, the packet that is instructed by the determination unit 224 to cancel the transmission. Consequently, it is possible to prevent the same packet as that transmitted from the base station 20-2 from being transmitted to the terminal device 30 in an overlapping manner, and it is thus possible to suppress useless consumption of the radio resource.

Furthermore, in the embodiment described above, each of the processing blocks held by the base station 20-1, the base station 20-2, and the terminal device 30 is a functional category divided in accordance with the main processing content in order to easily understand each of the devices in the embodiment. Accordingly, the disclosed technology is not limited by a method of dividing the processing blocks or by the name of each of the processing blocks. Furthermore, each of the processing blocks included in the base station 20-1, the base station 20-2, and the terminal device 30 may also be subdivided into a larger number of processing blocks in accordance with the processing content, or alternatively, a plurality of processing blocks may also be integrated into a single processing block. Furthermore, part or all of the processes performed by each of the processing blocks may also be implemented by a process performed by software, or may also be implemented by dedicated hardware, such as an application specific integrated circuit (ASIC).

According to an aspect of an embodiment of the base station, the terminal device, and the communication system disclosed in the present invention, an advantage is provided in that it is possible to suppress an increase in traffic between base stations.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A base station comprising:
a first receiver that receives information indicating a load status of processor circuitry that processes transmission of data of another base station from the other base station;
a first transmitter that transmits, to the other base station, duplication of data to be transmitted to a terminal device; and
a second transmitter that transmits the data to the terminal device by using radio communication, wherein
the first transmitter transmits, after the transmission of the data performed by the second transmitter has been completed, in accordance with the information indicating the load status, a transmission completion notification that indicates that the transmission of the data has been completed to the other base station.

2. The base station according to claim 1, wherein, after the transmission of the data performed by the second transmitter has been completed, when it is determined, based on the information indicating the load status, that the transmission of the duplication of the data to the terminal device performed by the other base station has not been completed, the first transmitter transmits, to the other base station, the transmission completion notification that indicates that the transmission of the data has been completed.

3. The base station according to claim 1, wherein
the information indicating the load status includes information that indicates a load status of processor circuitry that processes at least one of a radio link control (RLC) layer and a media access control (MAC) layer in the other base station.

4. The base station according to claim 1, wherein
the first receiver periodically receives the information indicating the load status from the other base station.

5. The base station according to claim 1, wherein
the first receiver receives the information indicating the load status when the load status is changed by an amount greater than or equal to a predetermined level.

6. The base station according to claim 1, further comprising a second receiver that receives the transmission completion notification transmitted from the other base station, wherein
when the second receiver receives the transmission completion notification from the other base station before the transmission of the data to the terminal device is completed, the second transmitter cancels the transmission of the data to the terminal device.

7. A base station comprising:
a first transmitter that transmits information indicating a load status of processor circuitry that processes transmission of data of the own device to another base station;
a receiver that receives, from the other base station, duplication of data to be transmitted to a terminal device; and
a second transmitter that transmits the duplication of the data to the terminal device by using radio communication, wherein
the receiver receives, from the other base station, a transmission completion notification that indicates that the transmission of the data has been completed, and
when the receiver receives the transmission completion notification from the other base station before the transmission of the duplication of the data to the terminal device is completed, the second transmitter cancels the transmission of the duplication of the data to the terminal device.

8. The base station according to claim 7, wherein
the information indicating the load status includes information that indicates a load status of processor circuitry that is included in the own device and that processes at least one of a RLC layer and a MAC layer.

9. The base station according to claim 7, wherein
the first transmitter periodically transmits the information indicating the load status to the other base station.

10. The base station according to claim 7, wherein
the first transmitter transmits the information indicating the load status when the load status is changed by an amount greater than or equal to a predetermined level.

11. A terminal device comprising:
a receiver that receives at least one of data that is transmitted from a first base station that
receives information related to a communication processing state of a second base station from the second base station,
transmits, to the second base station, duplication of data to be transmitted to the terminal device,
transmits the data to the terminal device by using radio communication, and
transmits, after the transmission of the data has been completed, in accordance with the information related to the communication processing state of the second base station, a transmission completion notification that indicates that the transmission of the data has been completed to the second base station, and
duplication of the data that is transmitted from the second base station that
transmits the information related to the communication processing state of the second base station to the first base station,
receives, from the first base station, the duplication of the data to be transmitted to the terminal device,
transmits the duplication of the data to the terminal device by using radio communication,
receives the transmission completion notification from the first base station, and
cancels, when the transmission completion notification is received from the first base station before the transmission of the duplication of the data to the terminal device is completed, the transmission of the duplication of the data to the terminal device.

12. A communication system comprising:
a first base station;
a second base station; and
a terminal device, wherein
the first base station includes
- a first receiver that receives information related to a communication processing state of the second base station from the second base station,
- a first transmitter that transmits, to the second base station, duplication of data to be transmitted to the terminal device, and
- a second transmitter that transmits the data to the terminal device by using radio communication, the first transmitter transmits, after the transmission of the data performed by the second transmitter has been completed, in accordance with the information related to the communication processing state, a transmission completion notification that indicates that the transmission of the data has been completed to the second base station, the second base station includes
- a third transmitter that transmits the information related to the communication processing state of the second base station to the first base station,
- a second receiver that receives, from the first base station, the duplication of the data to be transmitted to the terminal device, and
- a fourth transmitter that transmits the duplication of the data to the terminal device by using radio communication, the second receiver receives the transmission completion notification from the first base station, and when the second receiver receives the transmission completion notification from the first base station before the transmission of the duplication of the data to the terminal device is completed, the fourth transmitter cancels the transmission of the duplication of the data to the terminal device.

\* \* \* \* \*